United States Patent [19]

Henton et al.

[11] Patent Number: 4,946,894

[45] Date of Patent: Aug. 7, 1990

[54] BLEND COMPRISING LARGE PROPORTIONS OF A EPDM GRAFT TERPOLYMER AND RELATIVELY SMALLER PROPORTIONS OF AN ACRYLATE RUBBER

[75] Inventors: David E. Henton; Douglas E. Beyer, both of Midland, Mich.

[73] Assignee: The Dow Chemical Company, Midland, Mich.

[21] Appl. No.: 232,268

[22] Filed: Aug. 15, 1988

Related U.S. Application Data

[63] Continuation-in-part of Ser. No. 898,743, Aug. 15, 1986, Pat. No. 4,766,175, which is a continuation of Ser. No. 737,368, May 23, 1985, abandoned.

[51] Int. Cl.$^5$ .................. C08L 51/04; C08L 51/06; C08L 25/12
[52] U.S. Cl. ........................ 525/71; 525/70; 525/84; 525/85; 525/80

[58] Field of Search .......................... 525/71

[56] References Cited

U.S. PATENT DOCUMENTS

| | | |
|---|---|---|
| 3,489,821 | 1/1970 | Witt et al. |
| 3,576,910 | 4/1971 | Jastrzebski et al. |
| 4,397,987 | 8/1983 | Cornell |
| 4,585,832 | 4/1986 | Kokubo |
| 4,766,175 | 8/1988 | Henton .................. 525/71 |

FOREIGN PATENT DOCUMENTS 53-34212  9/1978  Japan.

*Primary Examiner*—Carman J. Seccuro
*Attorney, Agent, or Firm*—Douglas N. Deline; James B. Guffey

[57] ABSTRACT

Rubber reinforced thermoplastic resins are provided comprising specific proportions of grafted EPDM terpolymer elastomers and grafted arcylate elastomers.

8 Claims, No Drawings

BLEND COMPRISING LARGE PROPORTIONS OF A EPDM GRAFT TERPOLYMER AND RELATIVELY SMALLER PROPORTIONS OF AN ACRYLATE RUBBER

CROSS REFERENCE TO RELATED APPLICATIONS.

This is a continuation-in-part of copending application Ser. No. 898,743 which was filed on Aug. 15, 1986 (and which issued as U.S. Pat. No. 4,766,175 on Aug. 23, 1988) and which was in turn a continuation of Ser. No. 737,368 which was filed on May 23, 1985 and which is now abandoned.

BACKGROUND OF THE INVENTION

The present invention relates to rubber reinforced resins. More particularly, the present invention relates to rubber reinforced resins having improved weather resistance and physical characteristics. In one embodiment, the present invention relates to an improved rubber reinforced styrene acrylonitrile resin.

It is previously known in the art to prepare rubber modified resins wherein the rubber is a copolymer or terpolymer containing ethylene, propylene and optionally a copolymerizable diene monomer. Such rubbers are known as EPDM rubbers. In U.S. Pat. No. 3,489,821 a blend comprising an EPDM graft terpolymer and a hard matrix resin is disclosed. At Col. 7, line 31, the reference teaches that the graft copolymer resin blend may be mixed with other resins and/or rubbers.

In U.S. Pat. No. 3,576,910, there is disclosed an ABS polyblend comprising matrix and grafted rubbers wherein the grafted superstrate consists at least principally of a monovinylidene aromatic hydrocarbon and an unsaturated nitrile, i.e., styrene acrylonitrile copolymer. Suitable rubbers for use in the polyblend include diene rubbers, acrylate rubbers, polyisoprene rubbers and mixtures thereof.

U.S. Pat. No. 4,585,832 disclosed weather and impact resistant resins containing both a grafted acrylate rubber and a different grafted rubber. The second rubber could be either an EPDM rubber or a diene based rubber. Amounts of acrylate from 60 to 97% based on total grafted rubber weight were employed. Unfortunately these resins generally possess an inferior low temperature toughness as measured by $-20°$ F. Izod impact testing.

In U.S. Pat. No. 4,397,987 a similar polyblend comprising a nitrile rubber and an EPDM graft rubber is disclosed. In Table 9, Col. I, a blend of an ungrafted EPDM rubber and HYCAR 4041, an acrylate rubber, was prepared. However, the compatibility of the rubber blend was so poor that the blend could not be cured.

Previously known rubber reinforced resins comprising an EPDM graft copolymer elastomer have demonstrated good toughness as evidenced by high impact resistance at 25° C. and good weather resistance, particularly resistance to ozone and radiation degradation. These resins, however, have demonstrated poor ductility, as shown by generally low elongations of from about 10 to 20 percent as measured by ASTM test D-638 at 0.2 inches/minute. Frequently, such resins are characterized by a "cheesy" or friable nature when flexed or drawn. This poor ductility in the resulting rubber reinforced weatherable polymer is believed to be a result of a low level of crosslinking inherent in the EPDM graft copolymer rubber. Whereas good weather resistance results from the use of EPDM copolymer rubbers due to the inherent chemical stability of such rubber, the same stability results in only a poor or limited ability to crosslink the EPDM rubber or graft with matrix polymer. While to some extent this problem may be alleviated by the use of greater amounts of initiator in the grafting processes or high temperature post treatment, such variations involve increased cost and ultimate contamination of the resin resulting in decreased weatherability, poor appearance or decreased notched Izod strength.

It would be desirable to provide an improved resin having good 25° C. Izod impact strength and weather resistance without loss of ductility. It would further be desirable to provide an improved styrene acrylonitrile resin achieving good low temperature Izod impact strength and weather resistance as well as good ductility without deleterious affects on the grafting or crosslinking in the EPDM rubber.

SUMMARY OF THE INVENTION

According to the present invention, there is now provided a rubber reinforced thermoplastic polyblend comprising from 10 to 40 percent by weight of an elastomer phase and 90 to 60 percent by weight of a matrix polymer wherein the elastomer phase comprises from 90 to 40 percent based on elastomer weight of a grafted EPDM terpolymer rubber and 10 to 60 percent based on elastomer weight of a grafted acrylate rubber further characterized in that both the grafted superstrate polymers and matrix polymer comprise:
  from 10 to 90 weight percent of a monovinylidene aromatic monomer selected from the group consisting of styrene, α-methyl styrene, and a ring alkyl or halo substituted styrenes;
  from 10 to 40 weight percent acrylonitrile; and
  from 0 to 80 weight percent of a monomer selected from the group consisting of methylmethacrylate, maleic anhydride, N-phenylmaleimide, and N-ethylmaleimide.

Surprisingly the polyblend of the invention possesses both an improved resin ductility and also good low temperature impact resistance making it an extremely useful molding resin.

DETAILED DESCRIPTION OF THE INVENTION

The matrix copolymer is typically prepared during the polymerization processes used to graft the EPDM and acrylate elastomers. Additional separately prepared matrix can also be produced and blended with the rubber containing resins. Preferred are matrix copolymers comprising from 65 to 90% monovinylidene aromatic monomer, 10 to 35% acrylonitrile and 0 to 20 percent methylmethacrylate. Most preferred matrix copolymers comprise 70 to 85% styrene and 15 to 30% acrylonitrile. The elastomer phase desirably comprises from 15 to 30 percent by weight of the polyblend of the invention.

EPDM rubbers employed to prepare the grafted elastomers for use in the present invention are well known in the art. Their description and a means for the preparation thereof have been provided in the previously cited U.S. Pat. Nos. 3,489,821 and 4,202,948, both of which teachings are incorporated herein in their entirety by reference thereto. While a variety of alpha-monoolefins may be used in preparing EPDM rubbers, most desirably are those elastomers comprise a terpolymer of ethylene and propylene with an ethylenically unsaturated copolymerizable non-conjugated diene monomer. Illustrative non-limiting examples of suitable dienes which may be used include dicyclopentadiene, ethylidene norbornene and 1,4-hexadiene.

Methods of preparing EPDM graft copolymers are also well known in the art. Suitably the graft copolymer is polymerized in the presence of the rubbery EPDM spine polymer utilizing either emulsion, suspension or solution polymerization techniques. Examples of EPDM graft copolymers are taught in U.S. Pat. Nos. 3,489,821, 3,489,822, 3,642,950 and 4,314,041 all of which are incorporated herein by reference. Preferred grafted EPDM rubbers have a volume average particle size from $0.5\mu$ to $5.0\mu$. Most preferred are those rubbers prepared by grafting the rubber spine in a solution or suspension process.

Acrylate rubbers for grafting and use according to the present invention are also previously known in the art and described, for example, in U.S. Pat. Nos. 3,830,878; 4,341,883; 3,944,631; 3,691,260 and 4,224,419, the teachings of which are incorporated herein by reference. Preferred acrylate rubbers are crosslinked homopolymers of $C_{1-8}$ alkyl acrylates, especially butyl acrylate or 2-ethylhexyl acrylate, and crosslinked copolymers thereof with up to about 25 weight percent, preferably up to about 10 percent, of a copolymerizable comonomer. Suitable copolymerizable comonomers include monovinylidene aromatic monomers, e.g. styrene, alpha-methyl styrene, etc., acrylonitrile and alkyl methylacrylates such as methyl methacrylate. A preferred acrylate rubber comprises polybutylacrylate optionally containing various di- and tri-vinyl substituted crosslinking and graft enhancing agents present in an amount up to about 5 percent by weight based on total rubber weight.

Preferably the acrylate rubber is prepared by an emulsion process. Emulsion polymerized acrylate rubbers when employed may be partially agglomerated as is previously known in the art in order to provide greater variety of particle size distribution in the resulting acrylate rubber product thereby controlling gloss and impact properties of the resin. The rubber particles can also be grown to various sizes by varying the polymerization conditions and/or a mixture of previously prepared large and small seed particles may be employed to form the grafted rubber. The grafted acrylate rubber's volume average particle diameter is preferably from about $0.05\mu$ to about $0.5\mu$, most preferably from $0.1\mu$ to $0.25\mu$. Volume average particle diameters are measured in the latex form of the rubber before grafting using techniques of Transmission Electron Microscopy or hydrodynamic chromatography as disclosed in U.S. Pat. No. 4,419,496. Grafting of acrylate rubbers is also well known to the skilled artisan and disclosed, for example, in the above cited U.S. Pat. Nos. 3,830,878; 4,341,893; 3,944,631; 3,691,260 and 4,224,419. Preferably the crosslinked acrylate rubber is grafted by means of an emulsion process.

The amount of grafting in both EPDM and acrylate rubbers may vary over wide ranges. As defined by percent grafting (attached rigid phase weight/rubber weight×100) the percent graft may be from about 5 to about 150. Preferred percent grafting limits are from about 10 to 100. Desirable grafting levels are dependent on particle sizes. Large rubber particles generally possess lesser amounts of graft copolymer on a percentage basis. While it is preferred that each rubber substrate be grafted with the same graft copolymer which further is identical with the matrix resin, different copolymers may be employed for the various graft copolymers and matrix copolymer provided that the same are mutually compatible.

By means of an appropriate selection of the elastomer particle size, amount of crosslinking and the total amount of EPDM and acrylate rubber used in the polyblend, resins having a wide variety of product properties may be prepared. Preferred compositions according to the invention are those wherein from 85 to 70 percent of the elastomer phase comprises a grafted EPDM terpolymer rubber and 15 to 30 percent of the elastomer comprises a grafted acrylate rubber.

In addition to the previously described grafted acrylate and EPDM rubbers, the present invented composition may optionally comprise other saturated elastomeric components including but not limited to vinyl acetate rubbers, hydrogenated diene rubbers, e.g. hydrogenated polybutadiene or hydrogenated block copolymers of butadiene with monovinylidene aromatic monomers and chlorinated polyethylenes. Preferably the elastomer consists essentially of the grafted EPDM rubber and grafted acrylate rubber.

While the matrix may also consist of a single copolymer, formed for example during the grafting process, additional compatible matrix polymer may be separately added. Separately added matrix may be the same or different from the above described matrix. Moreover the polyblend of the invention may suitably be blended with other polymers to prepare useful molding resins. Nonlimiting examples of suitable other polymers are aromatic polycarbonates, polyaryl ethers, polysulfones, polyvinyl chloride, polystyrene, and polymethylmethacrylate.

Stabilizers such as antioxidants and ultraviolet absorbers and screeners can also be added. Examples of antioxidants include the hindered phenolic, thioester, phosphate and hindered amine antioxidants. Suitable U.V. active stabilizers include the aromatic ketones, hydroxy ketones and esters, as well as other species that have U.V. absorption capability. Flow aids, plasticizers, and lubricants can also be added to the present invention.

Having described the invention the following examples are provided as further illustrative and are not to be construed as limiting.

EXAMPLE 1

A suspension grafted EPDM rubber modified styrene acrylonitrile copolymer resin containing 23% elastomer (ROVEL TM 401 available from The Dow Chemical Company) was blended with various amounts of an emulsion grafted acrylate rubber containing styrene acrylonitrile copolymer resin containing 45.1% elastomer. Various ratios of EPDM to grafted acrylate were prepared in the blend. The blends were compounded on a 0.8 inch Welding Engineers Extruder and were injection molded at 450° F. (232° C.), 110° F. (43° C.) mold temperature using a 2 ounce Negri Bossi molding machine. The resulting molded samples were tested for ductility as measured by percent elongation, and also low and high temperature toughness as measured by Izod impact data. Results are contained in Table I.

TABLE I

| Run | % EPDM Elastomer | % Acrylate Elastomer | Total Elastomer | Ty[1] | % E[2] | 73° F. Izod[3] | −20° F. Izod[4] |
|---|---|---|---|---|---|---|---|
| ROVEL 401* | 100 | 0 | 23 | 5450 | 17 | 12.9 | 2.3 (D)[5] |
| Example 1 | 50 | 50 | 18 | 5350 | 45 | 2.4 | 0.8 (B)[6] |
| Example 2 | 60 | 40 | 25 | 6410 | 25 | 8.9 | 0.9 (B) |
| Example 3 | 78 | 22 | 23 | 5550 | 40 | 11.9 | 1.4 (D) |

[1] Tensile yield in psi at 0.2 inch/min
[2] % elongation at 0.2 inch/min
[3] Notched Izod at 73° F. (23° C.) ft lb/inch of notch
[4] Notched Izod at −20° F. (−29° C.) ft lb/inch of notch
[5] D = Ductile failure
[6] B = Brittle failure
*Not an example of the present invention As can be seen be reference to Table I blends prepared according to the present invention possess improved elongation and retain reasonably good low temperature Izod impact when compared to compositions containing only EPDM elastomers.

EXAMPLES 4–5

In another series of experiments pigmented samples were prepared and molded into flat test specimens for instrumented dart impact testing at 8000 in/min. The improved low temperature toughness of the products of the current invention are seen by reference to the results of such testing which are contained in Table II.

TABLE II

| Run | Color* | % EPDM[1] Elastomer | % Acrylate[2] Elastomer | Total Elastomer | Energy to Fail[3] 73° C. | Energy to Fail[3] −20° F. |
|---|---|---|---|---|---|---|
| **Comparative A | White | 13 | 87 | 22.5 | 400 | 70 |
| **Comparative B | Brown | 13 | 87 | 22.5 | 350 | 10 |
| Example 4 | White | 43 | 57 | 23.5 | 440 | 220 |
| Example 5 | Brown | 43 | 57 | 23.5 | 430 | 110 |

*8% White concentrate 8844-E1 available from Americhem Inc. 6% Brown concentrate 8857-E1 available from Americhem Inc.
**Not an example of the present invention
[1] Solution grafted EPDM having 1.3μ rubber particles
[2] Emulsion prepared and grafted 1500Å n-butylacrylate particles
[3] Total energy to failure in inch-lbs using instrumented dart impact

EXAMPLES 6–7

Another series of blends were prepared using an SAN solution grafted EPDM elastomer. Various levels of a grafted acrylate elastomer and free SAN matrix were compounded with the elastomer and molded disks prepared as in Example 1. Results are contained in Table III. The products prepared in examples 6 and 7 demonstrate an enhanced ductility compared to resins containing only an EPDM elastomer as evidenced by improved elongation. At the same time impact strength especially low temperature impact strength indicated by the energy to fail at −20° F. (−29° C.) is not adversely affected.

1. A rubber reinforced thermoplastic polyblend comprising from 10 to 40 percent by weight of an elastomer and 90 to 60 percent by weight of a matrix polymer wherein the elastomer comprises from 85 to 70 percent based on elastomer weight of a grafted EPDM terpolymer rubber and 15 to 30 percent based on elastomer weight of a grafted acrylate rubber further characterized in that both the grafted superstrate polymers and matrix polymer comprise:
   from 10 to 90 weight percent of a monovinylidene aromatic monomer selected from the group consisting of styrene, α-methylstyrene and ring alkyl or halo substituted styrenes;
   from 10 to 40 weight percent acrylonitrile; and
   from 0 to 80 percent of a monomer selected from the group consisting of methylmethacrylate, N-phenylmaleimide, maleic anhydride, and N-ethylmaleimide.

2. The polyblend according to claim 1 wherein the grafted EPDM terpolymer rubber is prepared in a solution polymerization grafting process.

3. A polyblend according to claim 1 wherein the grafted acrylate has a volume average particle size from 0.05 microns to 0.5 microns and the grafted EPDM rubber has a volume average particle size from 0.5 microns to 5.0 microns.

TABLE III

| Run | % EPDM Elastomer | % Acrylate Elastomer | Total % Elastomer | Ty[1] | Energy to Fail[2] 73° F. | Energy to Fail[2] −20° F. | % E[3] | Izod[4] |
|---|---|---|---|---|---|---|---|---|
| *Comparative C | 100 | 0 | 23 | 6050 | 420 | 440 | 13 | 8.2 |
| *Comparative D | 95 | 5 | 23.6 | 5960 | 420 | 490 | 16 | 8.8 |
| *Comparative E | 91 | 9 | 24.2 | 5880 | 400 | 530 | 13 | 9.6 |
| Example 6 | 82 | 18 | 25.3 | 5700 | 400 | 470 | 23 | 10.5 |
| Example 7 | 74 | 26 | 26.5 | 5470 | 390 | 450 | 34 | 11.4 |

*Not an example of the present invention
[1] Tensile yield in psi at 0.2 inches/min
[2] Energy to fail in inch-lbs using instrumented dart impact 73° F. (23° C. and −20° F. (−29° C.)
[3] % elongation at 0.2 inches/min
[4] Notched Izod impact ft lb/inch of notch at 73° F. (23° C.)

What is claimed is:

4. A polyblend according to claim 1 wherein the acrylate graft phase, EPDM graft phase and matrix all comprise a copolymer of styrene and acrylonitrile.

5. A polyblend according to claim 4 wherein the styrene acrylonitrile copolymer contains from 70 to 85 percent by weight styrene and 15 to 30 percent by weight acrylonitrile.

6. The polyblend of claim 1 wherein the acrylate rubber is a crosslinked homopolymer of a $C_1$-$C_8$ acrylate or a crosslinked copolymer of a $C_1$-$C_8$ acrylate with up to about 25 weight percent of a copolymerizable comonomer selected from the group consisting of monovinylidene aromatic monomers, acrylonitrile and alkyl methacrylates.

7. The polyblend of claim 1 wherein the acrylate rubber is a crosslinked copolymer of a $C_1$-$C_8$ acrylate with up to about 25 weight percent of a copolymerizable comonomer selected from the group consisting of monovinylidene aromatic monomers, acrylonitrile and alkyl methacrylates.

8. The polyblend of claim 1 wherein the grafted EPDM terpolymer rubber is prepared in a solution or suspension graft polymerization process.

* * * * *